April 3, 1956    W. BERTHOLD    2,740,510
ACCELERATION AND DECELERATION CONTROL FOR MACHINES
Filed Dec. 19, 1952

INVENTOR
W. BERTHOLD
BY [signature]
ATTORNEY

United States Patent Office 2,740,510
Patented Apr. 3, 1956

2,740,510

ACCELERATION AND DECELERATION CONTROL FOR MACHINES

Wolf Berthold, Englewood, N. J., assignor to Western Electric Company, Incorporated, New York, N. Y., a corporation of New York Application December 19, 1952, Serial No. 327,009

9 Claims. (Cl. 192—12)

This invention relates to speed control for driven machines and particularly to a method of, and a system for, controlling the acceleration and/or deceleration of machines at predetermined rates regardless of variations in load.

A particularly difficult problem arises in starting and stopping machines which reel or unreel material. This category, to name a few, includes wire drawing machines, wire insulating machines, twisting and stranding machines and coil winding machines. If these machines are started or stopped too fast or too slowly, the wire, fabric or the material involved may break, stretch or over-feed. Depending on whether a machine is started or stopped with full or empty reels, it is possible to have widely varying machine inertia and, therefore, wide variations in acceleration and deceleration if the starting or brake torques remain constant.

The usual types of motors such as squirrel cage or D. C. shunt motors, cannot readily be accelerated or decelerated automatically and uniformly when load torque and machine inertia vary from one start or stop to the next. This also holds true for clutches and brakes.

It is the general object of the present invention to provide a method of and a system for accelerating and decelerating a shaft subject to variable loading at predetermined rates.

In accordance with the present invention the speed of a shaft is varied at a predetermined or desired rate by varying the speed of a constant, known mass at the predetermined or desired rate and by deriving a potential proportional to the difference between the speeds of the shaft and of the mass and selectively applying energy to or absorbing energy from the shaft at a rate proportional to the derived potential.

A preferred embodiment of the invention utilizes a system of clutches and brakes wherein a driving motor or a driving shaft is coupled to the machine shaft through a combination electromagnetic fluid clutch and brake unit and to a relatively small control flywheel through a similar but smaller clutch and brake unit. Manually adjustable rheostats control the currents energizing the latter unit to determine the acceleration and deceleration rates of the flywheel. A control rheostat for energizing the main clutch and brake unit is adjusted automatically according to the difference in speed between the flywheel and the machine shaft so that energy transmitted to, or absorbed from, the machine shaft is varied to change the shaft speed at the rate selected for the flywheel.

In accordance with a feature of the present invention, the preferred embodiment described above may be modified whereby the machine shaft may be driven at the variable but controlled speed of any available control source. To accomplish this, the flywheel and its associated equipment is omitted and the control rheostat is utilized to energize the main clutch and brake unit automatically according to the difference in speed between the control source and the machine shaft.

Other objects and features of the invention will be apparent from the following detailed description taken in conjunction with the attached drawing, in which.

Figure 1:
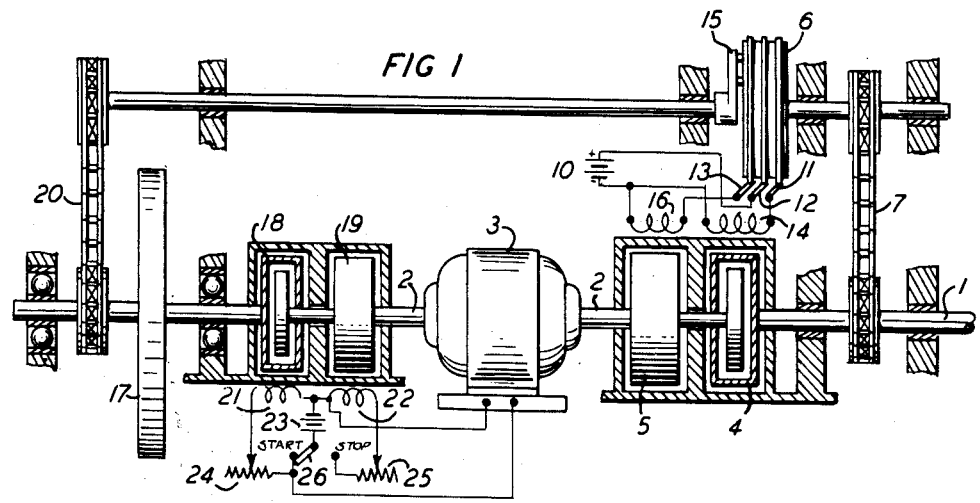
Fig. 1 is a schematic diagram of a control system in accordance with the invention.
Figure 2:
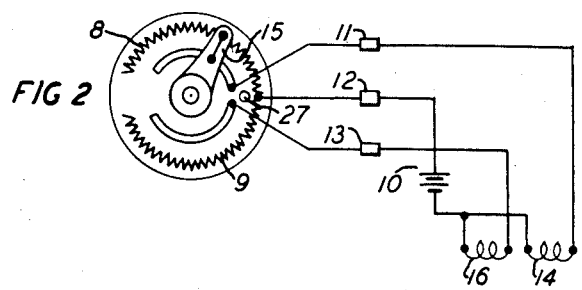
Fig. 2 is a schematic illustration of the power rheostat of Fig. 1.

Referring now to the drawing, in Fig. 1, the machine shaft 1 is driven by motor shaft 2 through a magnetic fluid power clutch 4 and engages to the machine frame through a magnetic fluid brake 5; the clutch 4 and brake 5 being of a combination unit type disclosed in Patent 2,573,065 to V. J. Salemme issued October 30, 1951. Circular power rheostat 6 is driven by the machine shaft 1 through a chain drive 7 so that it will rotate synchronously or at a definite ratio to it (rheostat 6 could also be driven directly by the machine shaft 1 or be geared to it). Fig. 2 discloses a schematic diagram of the rheostat 6, the resistance winding of which is divided into a power clutch portion 8 and a power brake portion 9. Excitation from the power source 10 is provided for the rheostat through the slip rings 11, 12 and 13, the clutch rheostat portion 8 and, therefore, the power clutch winding 14 being energized when the movable contact arm 15 engages the clutch portion 8; the brake portion 9 and, therefore, the power brake winding 16 being energized when the arm 15 engages the brake portion 9.

The motor shaft 2 is also coupled to a ball bearing mounted flywheel 17 through a control clutch 18 and brake 19 unit similar to the power clutch 4 and brake 5 unit but of relatively small size. Rheostat contact arm 15 is driven by the flywheel through the chain drive 20 (it could also be mounted on or geared to the flywheel) so that it will rotate synchronously or at a definite ratio to it (depending on how the rheostat 6 is rotated with respect to the machine shaft 1).

The control clutch 18 and brake 19 are selectively actuated by the energizing windings 21 and 22 from the source 23 through the rheostats 24 and 25 respectively. The settings of rheostats 24 and 25 determines the acceleration and deceleration of the flywheel 17 since the amount of torque transmitted through the clutch and brake depends on the strength of the fields established by the windings 21 and 22 respectively. Switch 26 is provided for starting and stopping the system and connections are included to this switch for energizing motor 3.

Operation of the system of Fig. 1

Switch 26, in "Stop" position during standstill, is moved to "Start" position to energize the motor 3, which will come up to full speed almost instantaneously. Operation of switch 26 also energizes control clutch 18 which then exerts a constant torque on the flywheel 17, the magnitude of which depends on the setting of the control clutch rheostat 24. As soon as the flywheel begins to move, rheostat arm 15, driven by the flywheel, moves up on the power clutch rheostat 8 (Fig. 2) and thus causes a current to flow through the power clutch winding 14 which now enables torque to be transmitted from the motor shaft 2 to rotate the machine shaft 1. The power rheostat 6, geared to the machine shaft 1, now begins to rotate in the same direction as the power rheostat arm 15. During acceleration, whenever the flywheel 17 accelerates faster than the machine shaft 1, the rheostat arm 15 will run ahead of the power clutch rheostat 8 and thereby increase the current through the power clutch winding 14 and hence machine shaft 1 accelerates faster; or, whenever the machine shaft 1 accelerates faster than the flywheel 17, the power rheostat 6 runs ahead of the rheostat arm 15 thereby reducing the current through the power clutch winding 14 (Fig. 2), thus reducing the acceleration rate of the machine shaft 1.

Should the rheostat arm 15 run all the way up on the power clutch rheostat 8, it will run up against a mechanical stop 27 (Fig. 2) which prevents it, and thereby the flywheel 17, from accelerating faster than the machine shaft 1 until the machine shaft has caught up with the preset acceleration rate of the flywheel 17. In this system, the acceleration of the machine shaft 1 will be practically the same as that of the flywheel 17 which in turn is preset through the control clutch rheostat 24.

As soon as the flywheel 17 has come up to full speed and runs synchronously with the driving shaft 2, the machine shaft 1 has done likewise. During running, the rheostat arm 15 will remain in that position on the power clutch rheostat 8 (Fig. 2) which it had in the last stage of acceleration. Should the load torque on the machine shaft 1 increase during operation for any cause whatsoever, the power clutch 4 may permit the machine shaft 1 to slip. At the slightest slip, however, the power rheostat 6 will lag against the rheostat arm 15, thereby increasing the current through power clutch 4 and restoring non-slip operation of the machine shaft 1. The system however also functions as a torque limiting device in that regardless of the torque of motor 3, machine shaft 1 can never be subjected to more driving torque than the power clutch will deliver at maximum clutch current.

To stop the machine shaft, switch 26 is thrown to "Stop" position, thereby opening the motor circuit to stop the motor, de-energize the control clutch 18 and energize the control brake 19. The brake torque exerted by the control brake 19 on the flywheel 17 depends on the setting of the control brake rheostat 25 and the deceleration of the flywheel will take place at a controlled and predetermined rate which may be varied simply by changing the brake rheostat 25 setting. As soon as deceleration of the flywheel 17 beings, the rheostat arm 15 lags against the power rheostat 6 and first reduces the power clutch current so as to cause the machine shaft 1 to slip against the driving shaft 2. If the rheostat arm 15 lags still further, it energizes the power brake winding 16 through the power brake rheostat 9 (Fig. 2) to actuate brake 5 and establish proper and uniform deceleration in synchronism with the flywheel deceleration. Should the machine shaft 1 for one reason or other, not decelerate as fast as the flywheel 17, the rheostat arm may run all the way up on the power brake rheostat 9 (Fig. 2) and up against the mechanical stop 27 so that the flywheel 17 would then decelerate slower than governed by the preset control rheostat value until the power brake 5 has again established the proper deceleration rate for the machine shaft 1. In this system, the deceleration will be practically the same as that of the flywheel as preset through the control brake rheostat 25.

Figure 3:
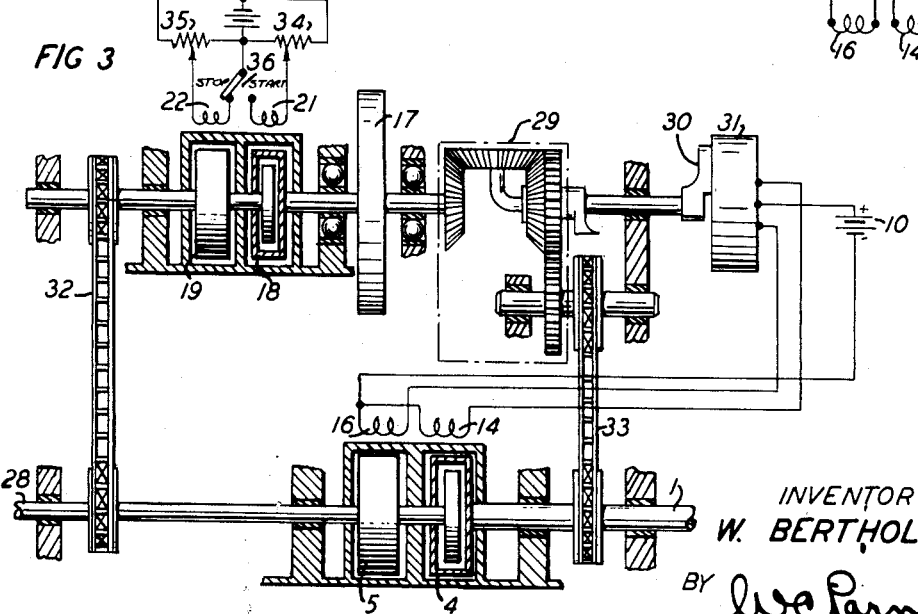
Fig. 3 is a schematic diagram of a system according to the invention having a stationary power rheostat, for use with an independently controlled drive shaft.

Fig. 3 discloses an embodiment utilizing the principles of the invention and adapted for use with an independently operated driving shaft 28 which may be a motor shaft driving several machines. Here the flywheel 17 is driven by the driving shaft 28 through a chain drive 32 and control clutch 18 and brake 19 unit. The flywheel 17 and the machine shaft 1 through chain drive 33, are both connected to a mechanical differential 29, the output of which drives the contact arm 30 of a stationary power rheostat 31. This stationary rheostat is electrically equivalent to that shown in Fig. 2 except that the winding excitation is obtained through direct connections to the source 10 and not through slip rings. In this system the control clutch 18 and brake 19 are selectively energized from potentiometers 34 and 35 respectively, through switch 36. The principles of operation of this system are substantially the same as those of Fig. 1.

The principal features of this invention lend themselves to many variations such as: controlled acceleration only, or controlled deceleration only, may be employed, in which case either the control brake and the power brake or the control clutch, respectively, and their associated equipment and circuits could be eliminated; or the power rheostat and its contact arm may be geared to the machine shaft and flywheel, respectively, so that they rotate at lower speeds in the eventuality that the response of the power clutch and power brake is not fast enough to insure smooth operation; or the control clutch and brake unit may comprise straight mechanical friction devices, the torque being controlled by adjustable pressure exerted on the friction surfaces by springs, air pressure or the like; or, if special acceleration rates such as afforded by the speed-torque characteristics of hydraulic, induction, or eddy-current clutches or the like are desired, such devices may be employed as driving means for the flywheel, but, since most of these devices are capable of transmitting torque from the driving to the driven member only when the latter slips against the former, gearing between the power rheostat contact arm and the power rheostat must be chosen such that at full speed (i. e. at synchronous speed for machine shaft and minimum slip for flywheel) the rheostat arm will tend to run slightly faster than the power rheostat or else the power clutch may slip since its speed is governed by that of the flywheel; or the machine shaft could be driven at variable but controlled speeds by driving the power rheostat arm from any source at any speed by omitting the flywheel but retaining the power rheostat and power clutch, in such a case the machine shaft will follow the rotational speed of the power rheostat arm.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In a power transmission system the combination with a shaft subject to variable loading, a motor for driving the shaft, an adjustable clutch coupling the motor to the shaft and an adjustable brake for the shaft, of means for controlling the acceleration and deceleration of the shaft substantially independent of the load comprising a control flywheel, a driving member therefor, adjustable clutching means connecting the flywheel to the driving member, adjustable braking means for the flywheel, means for deriving a potential proportional to the difference between the speeds of the shaft and the flywheel, means for selectively actuating the clutch and brake in accordance with the derived potential and means for adjusting the effectiveness of the clutching and braking means of the flywheel to adjust the acceleration and deceleration rates of the shaft.

2. In a power transmission system the combination with a shaft subject to variable loading, a motor for driving the shaft, an adjustable clutch coupling the motor to the shaft and an adjustable brake for the shaft, of means for controlling the speed of the shaft substantially independently of the load comprising a control flywheel, a driving member therefor, adjustable clutching means connecting the flywheel to the driving member, adjustable braking means for the flywheel, means for deriving a potential proportional to the difference between the speeds of the shaft and the flywheel, and means for selectively actuating the clutch and brake in accordance with the derived potential.

3. In a power transmission system the combination with a shaft subject to variable loading, a motor for driving the shaft, an adjustable clutch coupling the motor to the shaft, of means for controlling the acceleration of the shaft substantially independently of the load comprising a control flywheel, a driving member therefor, adjustable clutching means connecting the flywheel to the driving member, means for deriving a potential proportional to the difference between the speeds of the shaft and the flywheel, means for selectively actuating the clutch in accordance with the derived potential and means for adjusting the effectiveness of the clutching means of the flywheel to adjust the rate of acceleration of the shaft.

4. A system for controlling the deceleration of a shaft subject to variable loading comprising driving means for the shaft, a control flywheel, a driving member for the flywheel, braking means for the flywheel, means for applying adjustable braking torque on the shaft and means for producing a signal proportional to the difference in speeds between the flywheel and the shaft to control the braking torque on the shaft.

5. In a power transmission system the combination with a shaft subject to variable loading, driving means for the shaft, an adjustable clutch coupling the driving means to the shaft, of means for controlling the acceleration of the shaft substantially independently of the load comprising a control flywheel, a driving member therefor, adjustable clutching means connecting the flywheel to the driving member, means for deriving a potential proportional to the difference bewteen the speeds of the shaft and the flywheel and means for selectively actuating the clutch in accordance with the derived potential.

6. In a power transmission system the combination with a shaft subject to variable loading, driving means for the shaft, an adjustable clutch coupling the driving means to the shaft and an adjustable brake for the shaft, a means for controlling the deceleration of the shaft substantially independently of the load comprising a control flywheel, a driving member therefor, adjustable braking means for the flywheel, means for deriving a potential proportional to the difference between the speeds of the shaft and the flywneel, means for selectively actuating the clutch and brake in accordance with the derived potential and means for adjusting the effectiveness of the braking means of the flywheel to adjust the deceleration rate of the shaft.

7. In a power transmission system the combination with a shaft subject to variable loading, a motor for driving the shaft, an adjustable clutch coupling the motor to the shaft and an adjustable brake for the shaft, of means for controlling the acceleration and deceleration of the shaft substantially independently of the load comprising a control flywheel, a driving member therefor, means for selectively applying a predetermined acceleration or deceleration torque on the flywheel, means for deriving a potential proportional to the difference between the speeds of the shaft and the flywheel and means for selectively actuating the clutch and brake in accordance wtih the derived potential.

8. In a power transmission system the combination with a shaft subject to variable loading, a motor for driving the shaft, an adjustable clutch coupling the motor to the shaft and an adjustable brake for the shaft, of means for controlling the acceleration and deceleration of the shaft substantially independently of the load comprising a control flywheel, adjustable clutching means connecting the flywheel to the motor, adjustable braking means for the flywheel, means for driving a potential proportional to the difference between the speeds of the shaft and the flywheel, and means for selectively actuating the clutch and brake in accordance with the derived potential.

9. In a power transmission system the combination with a variable speed control mass, a shaft subject to variable loading, driving means for the shaft, an adjustable clutch coupling the driving means to the shaft and an adjustable brake for the shaft, of means for varying the speed of the shaft in accordance with the speed of the control mass and substantially independently of the load comprising a rheostat, energizing means for the rheostat, means for varying the potential output of the rheostat at a rate proportional to the difference between the speeds of the shaft and the control mass and means for selectively actuating the clutch and brake in accordance with the derived potential.

References Cited in the file of this patent

UNITED STATES PATENTS

| | | |
|---|---|---|
| 2,429,570 | Trofimov | Oct. 21, 1947 |
| 2,549,829 | Maxwell | Jan. 25, 1949 |
| 2,598,164 | Hamill | May 27, 1952 |